United States Patent
Chen et al.

(10) Patent No.: US 8,978,969 B2
(45) Date of Patent: Mar. 17, 2015

(54) ANTI-COUNTERFEIT DEVICE WITH DYNAMIC BARCODE, SYSTEM AND METHOD FOR ANTI-COUNTERFEIT WITH DYNAMIC BARCODE

(71) Applicant: Industrial Technology Research Institute, Chutung, Hsinchu (TW)

(72) Inventors: Yen-Chiu Chen, Hsinchu (TW); Sheng-Lin Chou, Hsinchu (TW)

(73) Assignee: Industrial Technology Research Institute, Chutung Township, Hsinchu County (TW)

( * ) Notice: Subject to any disclaimer, the term of this patent is extended or adjusted under 35 U.S.C. 154(b) by 120 days.

(21) Appl. No.: 13/742,222

(22) Filed: Jan. 15, 2013

(65) Prior Publication Data

US 2014/0103105 A1    Apr. 17, 2014

(30) Foreign Application Priority Data

Oct. 17, 2012    (TW) .............................. 101138189 A (51) Int. Cl.
 *G06F 17/00* (2006.01)
 *G06K 5/00* (2006.01)
 (Continued)

(52) U.S. Cl.
 CPC ............ *G06K 5/00* (2013.01); *G06K 19/06056* (2013.01); *G06K 19/06037* (2013.01); *G06K 19/06028* (2013.01); *G06K 19/06112* (2013.01); *G06K 19/14* (2013.01)
 USPC ..................................... 235/375; 235/462.12

(58) Field of Classification Search
 USPC ................... 235/375, 462.09–10, 46
 See application file for complete search history.

(56) References Cited

U.S. PATENT DOCUMENTS

2009/0106042 A1    4/2009    Maytal et al.

2009/0218391 A1*    9/2009    He ............................... 235/375

(Continued)

FOREIGN PATENT DOCUMENTS

| TW | M326685 U | 2/2008 |
| TW | I323858 B | 4/2010 |
| TW | 201211900 A | 3/2012 |

OTHER PUBLICATIONS

Lei, Pouwan et al., A Secure Mobile Track and Trace System for Anti-counterfeiting, IEEE International Conference on e-Technology, e-Commerce and e-Service, 2005, pp. 686-689.

(Continued)

*Primary Examiner* — Daniel St Cyr
(74) *Attorney, Agent, or Firm* — Muncy, Geissler, Olds & Lowe P.C.

(57) ABSTRACT

An anti-counterfeit device with dynamic barcodes is disclosed. An anti-counterfeit system with dynamic barcodes provides an anti-counterfeit mechanism when a user uses an electronic value barcode. The anti-counterfeit device includes a barcode generator module, an anti-counterfeit generator module and a combination module. The barcode generator module generates electronic barcodes that can be read directly by a barcode reader. The anti-counterfeit generator module generates dynamic anti-counterfeit labels with dynamic exchange information varying in time. The combination module generates anti-counterfeit barcodes by combining the electronic barcodes and the dynamic anti-counterfeit labels. The dynamic anti-counterfeit labels are visible, and are used for enhancing the anti-counterfeit capability of the electronic barcodes. Moreover, the electronic barcode with the dynamic anti-counterfeit labels can be read directly and correctly by the barcode reader without illuminant interference. Therefore, whether the electronic barcodes are forged barcodes is determined by observing the dynamic changes of the dynamic anti-counterfeit labels.

18 Claims, 9 Drawing Sheets
(5 of 9 Drawing Sheet(s) Filed in Color)

(51) Int. Cl.
*G06K 19/06* (2006.01)
*G06K 19/14* (2006.01)

(56) References Cited

U.S. PATENT DOCUMENTS

2011/0000958 A1   1/2011   Herzig
2011/0227729 A1*  9/2011   Parameswaran et al. ..... 340/540

OTHER PUBLICATIONS

Ono, Satoshi, Animated Two-Dimensional Barcode Generation Using Optimization Algorithms Redesign of Formulation, Operator, and Quality Evaluation, Journal of Advanced Computational Intelligence and Intelligent Informatics, 2009, vol. 13, No. 3, pp. 245-254.

Vongpradhip, Sartid et al., QR code using invisible watermarking in frequency domain, International Conference on ICT and Knowledge Engineering, 2011, pp. 47-52.

Chong, Cheun Ngen et al., Anti-counterfeiting with a Random Pattern, International Conference on Emerging Security Information, Systems and Technologies, 2008, pp. 146-153.

Ono, Satoshi et al., Fusion of interactive and non-interactive evolutionary computation for two-dimensional barcode decoration, IEEE Congress on Evolutionary Computation (CEC), 2010, pp. 1-8.

McCune, Jonathan M. et al., Seeing-Is-Believing: Using Camera Phones for Human-Verifiable Authentication, IEEE Symposium on Security and Privacy, 2005, pp. 110-124.

* cited by examiner

ANTI-COUNTERFEIT DEVICE WITH DYNAMIC BARCODE, SYSTEM AND METHOD FOR ANTI-COUNTERFEIT WITH DYNAMIC BARCODE

CROSS-REFERENCE TO RELATED APPLICATIONS

This application claims priority to Taiwanese Application Serial No. 101138189, filed on Oct. 17, 2012. The entirety of the above-mentioned patent application is hereby incorporated by reference herein and made a part of this specification.

BACKGROUND

1. Technical Field

The present disclosure relates to an anti-counterfeit barcode technology, an anti-counterfeit device with dynamic barcodes, an anti-counterfeit system with dynamic barcodes and the method thereof.

2. Description of Related Art

With the rapid development of science and technology, electronic devices are now widely used in different applications. For example, the Ministry of Finance of R.O.C. has provided an "E-invoice integrated platform" to enable consumers to apply for a mobile barcode and an authentication code; the mobile barcode can be used for storing electronic invoicing.

Formerly paper-based barcodes were read mainly by a barcode reader. However, with the rapid development of electronic devices, barcodes on a mobile phone can be used for transactions and verification, such as barcodes of a coupon. For example, according to the current E-invoice mechanism, the issuing section is able to transmit barcode information to the POS system of a convenient store (i.e., a shop) via a network with the batch mode, and then the barcode information is transmitted to a consumer's mobile phone via a real-time network. The consumer's mobile phone can obtain and generate a barcode directly. The consumer conducts a transaction with the use of the barcode in a convenience store. However, the barcode may be remade, recorded or replicated by other people using a camera phone before the consumer conducts a transaction with the barcode. Such behavior results in the consumer's loss of credit or money. The convenience store system and the issuing section provide a number of transaction and verification methods, such as real-time network transactions, wireless network transactions or network transactions with the batch mode, but these transaction and verification methods cannot determine whether the barcode is a forged barcode. If the POS system including an anti-counterfeit mechanism is rebuilt, it needs to take considerable time and the implementation cost will be increased.

General paper-based barcodes normally use watermarking, laser stickers, entity particles attached to a paper to provide an anti-counterfeit preliminary mechanism, but the barcodes on current electronic devices do not have a complete anti-counterfeit mechanism. The main reason is that according the conventional anti-counterfeit method, it is difficult to determine whether electronic barcodes are forgery barcodes due to remaking, recording or replicating the electronic barcodes. Moreover, due to the widely use of value barcodes, the value barcodes' anti-counterfeit verification mechanism is getting more important.

Consequently, developing an anti-counterfeit barcode mechanism for an electronic device is getting more crucial, especially an electronic barcode can be determined by observing the appearance of the electronic barcode in order to solve the problem of remaking, recording or replicating the electronic barcode. Accordingly, such technical problem needs to be solved.

SUMMARY

The present disclosure provides an anti-counterfeit device with dynamic barcodes. The anti-counterfeit device with dynamic barcodes includes a barcode generator module for generating an electronic barcode read by a barcode reader; an anti-counterfeit generator module for generating a dynamic anti-counterfeit label in each of a predetermined time; and a combination module for generating an anti-counterfeit barcode by combining the electronic barcode and the dynamic anti-counterfeit label, wherein the electronic barcode with the dynamic anti-counterfeit label is read by the barcode reader.

The present disclosure also provides an anti-counterfeit system with dynamic barcodes. The anti-counterfeit system includes an issuing server for generating exchange information and a random number sequence; a user anti-counterfeit device for receiving the exchange information and the random number sequence generated by the issuing server, and generating an electronic barcode with the exchange information and the random number sequence; and an exchange server for receiving the exchange information and the random number sequence generated by the issuing server, and comparing the received exchange information and random number sequence with the electronic barcode generated by the user anti-counterfeit device in order to ensure correctness of the exchange information when a user conducts a transaction.

Further, the present disclosure provides an anti-counterfeit method with dynamic barcodes. The anti-counterfeit method includes the steps of submitting an exchange request to an issuing server from a user anti-counterfeit device; transmitting exchange information and a random number sequence corresponding to the exchange request to the user anti-counterfeit device from the issuing server; generating an electronic barcode from the user anti-counterfeit device based on the exchange information and the random number sequence; conducting a transaction between an exchange server and a user based on the electronic barcode shown on the user anti-counterfeit device; and comparing the exchange information and the random number sequence of the exchange server with the electronic barcode of the user anti-counterfeit device to ensure correctness of all the exchange information including the random number.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present disclosure can be more fully understood by reading the following detailed description of the preferred embodiments, with reference made to the accompanying drawings, wherein.

DETAILED DESCRIPTION

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Figure 1:
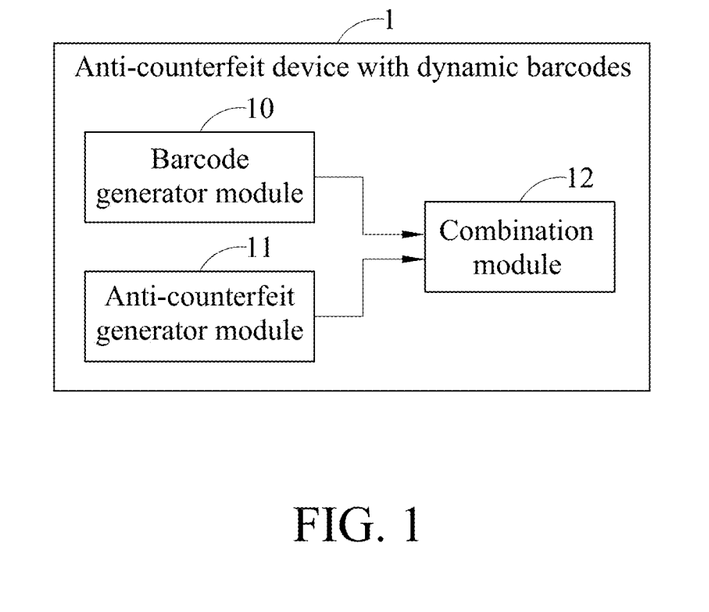
FIG. 1 is a systematic schematic diagram illustrating an anti-counterfeit device with dynamic barcodes according to the present disclosure.

FIG. 1 shows a schematic diagram of an anti-counterfeit device 1 with dynamic barcodes according to the present disclosure. The anti-counterfeit device 1 with dynamic barcodes (hereinafter referred to as the anti-counterfeit device 1) is an electronic device, such as a mobile phone, a tablet PC and a smartphone, being able to receive and to display an electronic barcode with anti-counterfeit features. Such an electronic device receives an electronic barcode having an anti-counterfeit mechanism over a wired network or a wireless network, and displays the electronic barcode on the electronic device's screen. The anti-counterfeit device 1 comprises a barcode generator module 10, an anti-counterfeit generator module 11 and a combination module 12.

The barcode generator module 10 is used for generating an electronic barcode that is read by a barcode reader. Specifically, the barcode generator module 10 receives a digital message from an external device, and the digital message will be converted into an electronic barcode. Subsequently, the issuing server transmits the electronic barcode without an anti-counterfeit mechanism to the user's electronic device. Therefore, the present disclosure provides a technical solution to resolve the problem that the electronic barcode may be remade, recorded or replicated.

The anti-counterfeit generator module 11 is used for generating a dynamic anti-counterfeit label in each of a predetermined time. Consequently, the anti-counterfeit generator module 11 is able to provide an anti-counterfeit mechanism for the electronic barcode due to the design of the dynamic anti-counterfeit label. Thus, the general static anti-counterfeit mechanism cannot be used effectively for solving the problem of remaking, recording or replicating the electronic barcode. Accordingly, the present disclosure provides a dynamic anti-counterfeit label with dynamic changes to enhance the anti-counterfeit capability of the electronic barcode.

The combination module 12 is used for generating an anti-counterfeit barcode by combining the electronic barcode and the dynamic anti-counterfeit label, wherein the electronic barcode with the dynamic anti-counterfeit label is read directly and correctly by the barcode reader. In other words, the combination module 12 combines the dynamic anti-counterfeit label generated by the anti-counterfeit generator module 11 with the electronic barcode generated by the barcode generator module 10 in order to produce an electronic barcode having the dynamic anti-counterfeit label, which is called an anti-counterfeit barcode. The dynamic anti-counterfeit label may be overlapped above or below the electronic barcode. The dynamic anti-counterfeit label is described in following embodiments of the present disclosure.

Note that the electronic barcode, even provided with the dynamic anti-counterfeit label, can be still read directly and correctly by a barcode reader. That is to say, the dynamic anti-counterfeit label is visible, and can be observed, but cannot be read by a barcode reader since the dynamic anti-counterfeit label randomly selects at least one color, whereby the selected color is a low light absorption rate related to the optical property of the barcode reader. For example, the barcode reader may be an infrared reader or an ultraviolet reader. Accordingly, the dynamic anti-counterfeit label cannot be read by the aforesaid barcode reader. Moreover, the color and size of the dynamic anti-counterfeit label may be selected randomly. The size of the dynamic anti-counterfeit label may be adjusted if necessary. According to the anti-counterfeit method of the present disclosure, the advantage of the dynamic anti-counterfeit label design is to enhance the anti-counterfeit capability of the electronic barcode without changing the reading manner of the electronic barcode. Therefore, a plurality of colors may be used to enhance the anti-counterfeit capability of the electronic barcode.

The present disclosure uses a combination of the electronic barcode and the dynamic anti-counterfeit label in order to provide the electronic barcode having the anti-counterfeit capability. The electronic barcode may be a one-dimensional barcode, a two-dimensional barcode or a multi-dimensional barcode. Therefore, the electronic barcode can be anti-counterfeited by the design of the dynamic anti-counterfeit label. The present disclosure is not limited to the electronic barcodes. The dynamic anti-counterfeit label is described in the following embodiments of the present disclosure. The dynamic anti-counterfeit label may be one of a dynamic time label, a direction label and a touch-based label.

Figure 2A:
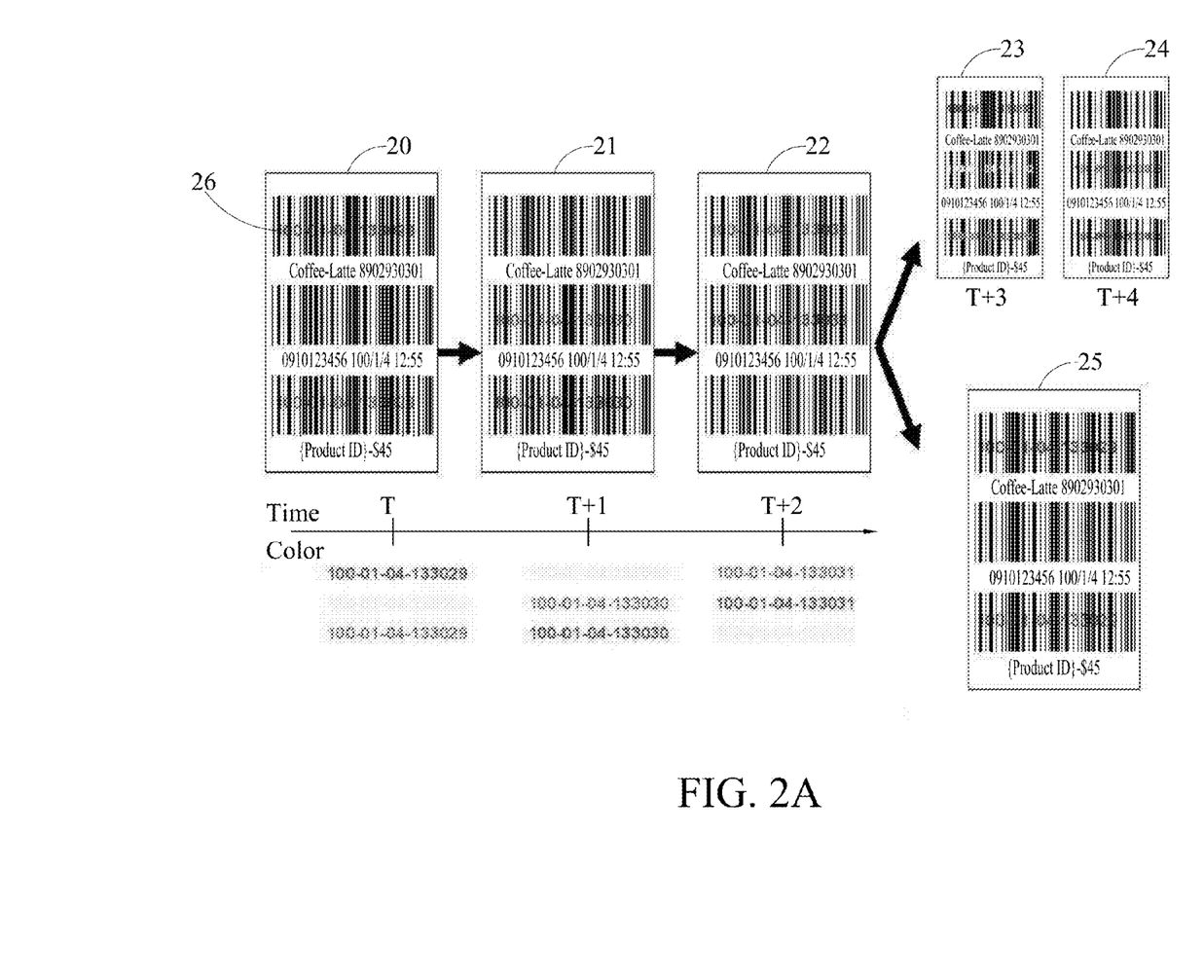
FIG. 2A is a schematic diagram illustrating the anti-counterfeit device with dynamic barcodes according to a first embodiment of the present disclosure.

FIG. 2A shows a schematic diagram illustrating the anti-counterfeit device with dynamic barcodes according to a first embodiment of the present disclosure. In the first embodiment of the present disclosure, the anti-counter generator module is used to generate a dynamic counterfeit label in, each of the predetermined time. The anti-counterfeit label uses at least one color with a low light absorption rate. In one embodiment of the present disclosure, current times may be displayed dynamically.

Colors with a low light absorption rate may be yellow, magenta or cyan while the barcode reader is an infrared reader. For example, magenta may be used for displaying a certain time. Alternatively, yellow, magenta and cyan may be used for dynamically displaying a certain time. As shown in FIG. 2A, the dynamic anti-counterfeit label attached to the electronic barcode 20-24 may vary in time (T, T+1, ..., T+4). The color of the dynamic anti-counterfeit label may be yellow, magenta or cyan, and may simultaneously display a certain time. Therefore, a user is able to see whether the color of the dynamic anti-counterfeit label 26 varies in time so that it can be determined whether the electronic barcode is remade or replicated. Also, as shown in FIG. 2A, if the electronic barcode is replicated, the color and time of the electronic barcode will be fixed. As a result, the electronic barcode having the dynamic anti-counterfeit label may be used to enhance the anti-counterfeit capability of the electronic barcode.

Figure 2B:
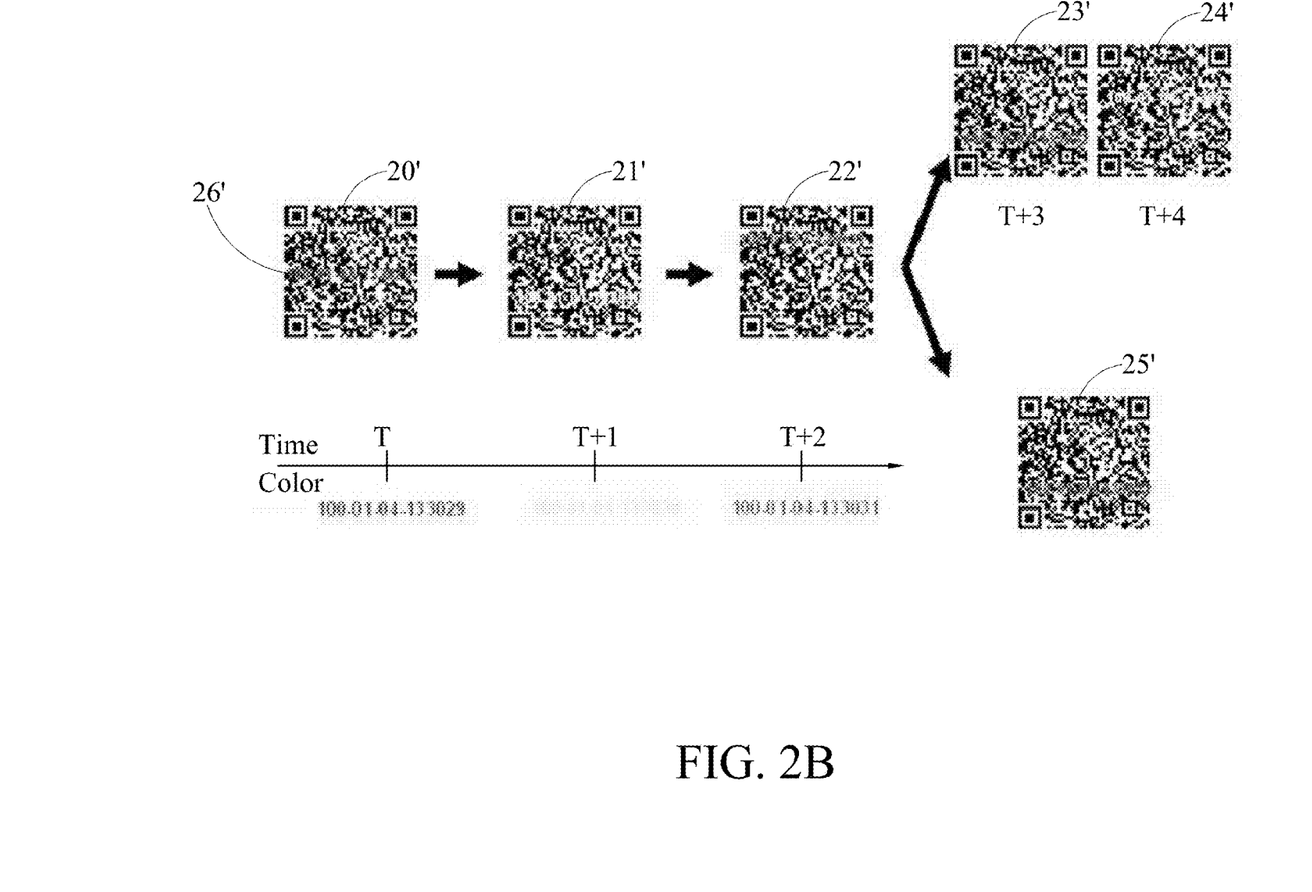
FIG. 2B is a schematic diagram illustrating the anti-counterfeit device with two-dimensional dynamic barcodes according to the first embodiment of the present disclosure.

According to the present disclosure, the electronic barcode may be a one-dimensional barcode, a two-dimensional barcode or a multi-dimensional barcode. According to the first embodiment of the present disclosure, a two-dimensional barcode is used as an example. FIG. 2B shows a schematic diagram of the anti-counterfeit device with the two-dimensional dynamic barcode according to the first embodiment of the present disclosure. The dynamic anti-counterfeit label attached to the electronic barcode 20'-24' may vary in time (T, T+1, . . . , T+4). The color of the dynamic anti-counterfeit label 26' may be yellow, magenta and cyan, and may simultaneously display a certain time. Therefore, a user is able to observe whether the color of the dynamic anti-counterfeit label 26' may vary in time. In the first embodiment of the present disclosure, it can be determined whether the electronic barcode is remade, recorded or replicated. As shown in FIG. 2A, if the electronic barcode is replicated, the color and time of the electronic barcode will be fixed. As a result, the electronic barcode having a dynamic anti-counterfeit label may be used to enhance the anti-counterfeit capability of the electronic barcode.

Figure 3:
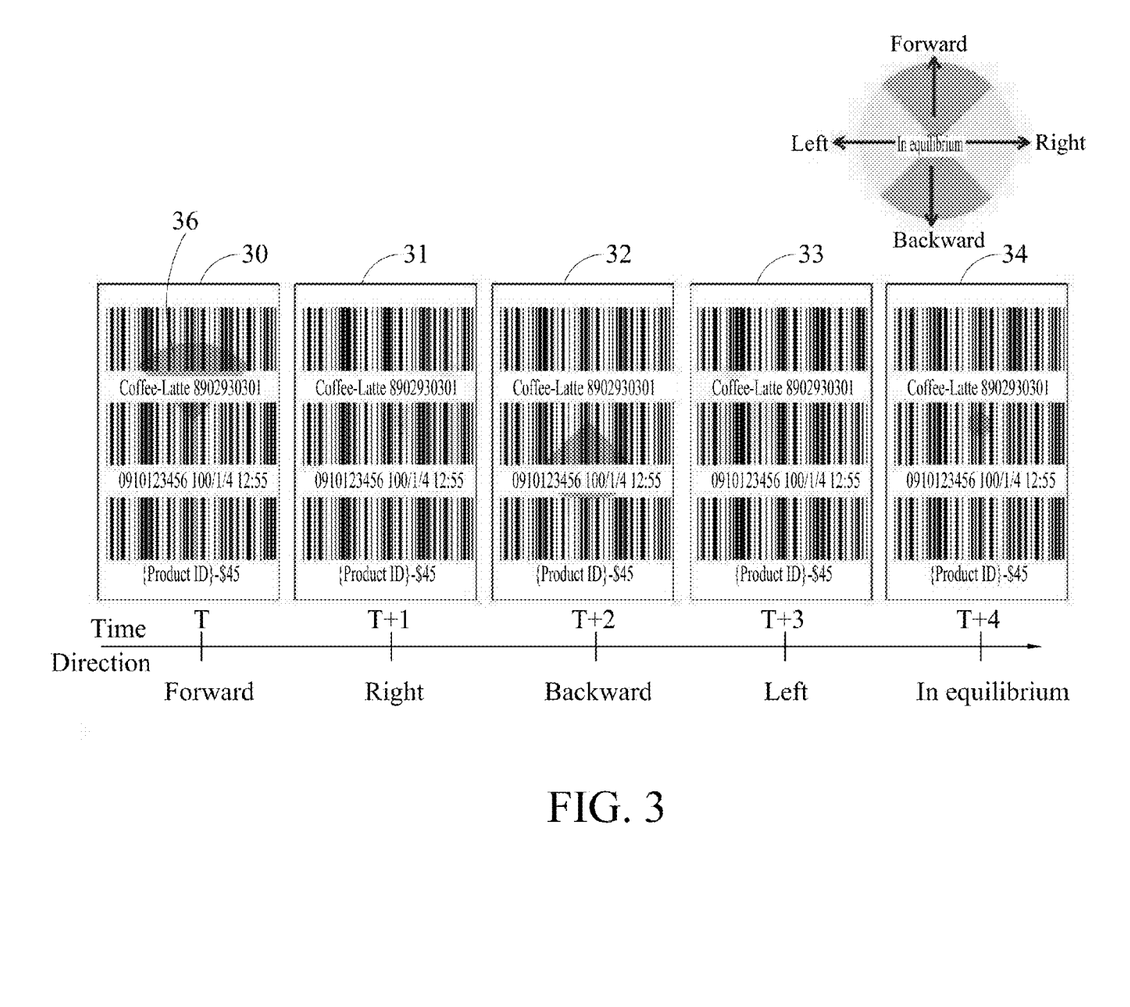
FIG. 3 is a schematic diagram illustrating dynamic variations of the anti-counterfeit device with dynamic barcodes according to a second embodiment of the present disclosure.

Referring to FIG. 3, a schematic diagram of the dynamic changes of the dynamic barcodes is illustrated according to a second embodiment of the present disclosure. In the second embodiment of the present disclosure, the anti-counterfeit generator module generates a corresponding direction as a dynamic anti-counterfeit label based on the movement of the anti-counterfeit device. Specifically, the anti-counterfeit device is able to detect different directions due to a gyroscope combined with an accelerometer built in a smartphone. As shown in FIG. 3, patterns of the directions also have different colors that are selected randomly. The color and the size of the patterns of the directions may be read by a barcode reader, and may vary in time.

The dynamic anti-counterfeit label 36 with a direction will be rotated while the anti-counterfeit device is rotated. In one example of the present disclosure, the dynamic anti-counterfeit label 36 with a forward arrow is displayed while the anti-counterfeit device is moved forward. In another example of the present disclosure, the dynamic anti-counterfeit label 36 with a backward arrow is displayed if the anti-counterfeit device is moved backward. In an alternative example of the present disclosure, if the anti-counterfeit device is moved to the left side, the dynamic anti-counterfeit label 36 with a left arrow will be displayed on the anti-counterfeit device. In a further example of the present disclosure, if the anti-counterfeit device is moved to the right side, the dynamic anti-counterfeit label 36 with a right arrow will be displayed on the anti-counterfeit device. The dynamic barcodes 30-34 are shown in FIG. 3, of which the dynamic barcode 34 is in equilibrium. In other words, according to the second embodiment of the present disclosure, if the anti-counterfeit device is moved, a multi-dimensional barcode with the directions displayed on the anti-counterfeit device may be read directly by a barcode reader. Preferably, if the anti-counterfeit device is moved, a multi-dimensional barcode with the directions having random colors displayed on the anti-counterfeit device may be read directly by a barcode reader. More preferably, a multi-dimensional barcode with the directions having random colors and sizes displayed on the anti-counterfeit device may be read directly by a barcode reader if the anti-counterfeit device is moved. Therefore, according to the second embodiment of the present disclosure, it can be determined whether the electronic barcode is remade, recorded or replicated. Accordingly, if the electronic barcode is remade, recorded or replicated, the color and size of the direction will be fixed.

It should be noted that the anti-counterfeit device may be moved randomly. Accordingly, the directions may also be changed randomly in order to enhance anti-counterfeit capability of the electronic barcode. In one embodiment of the present disclosure, the electronic barcode may be a two-dimensional barcode. In the second embodiment of the present disclosure, the dynamic anti-counterfeit label and the anti-counterfeit method of the electronic barcode with the directions are similar to these of the first embodiment of the present disclosure.

Figure 4:
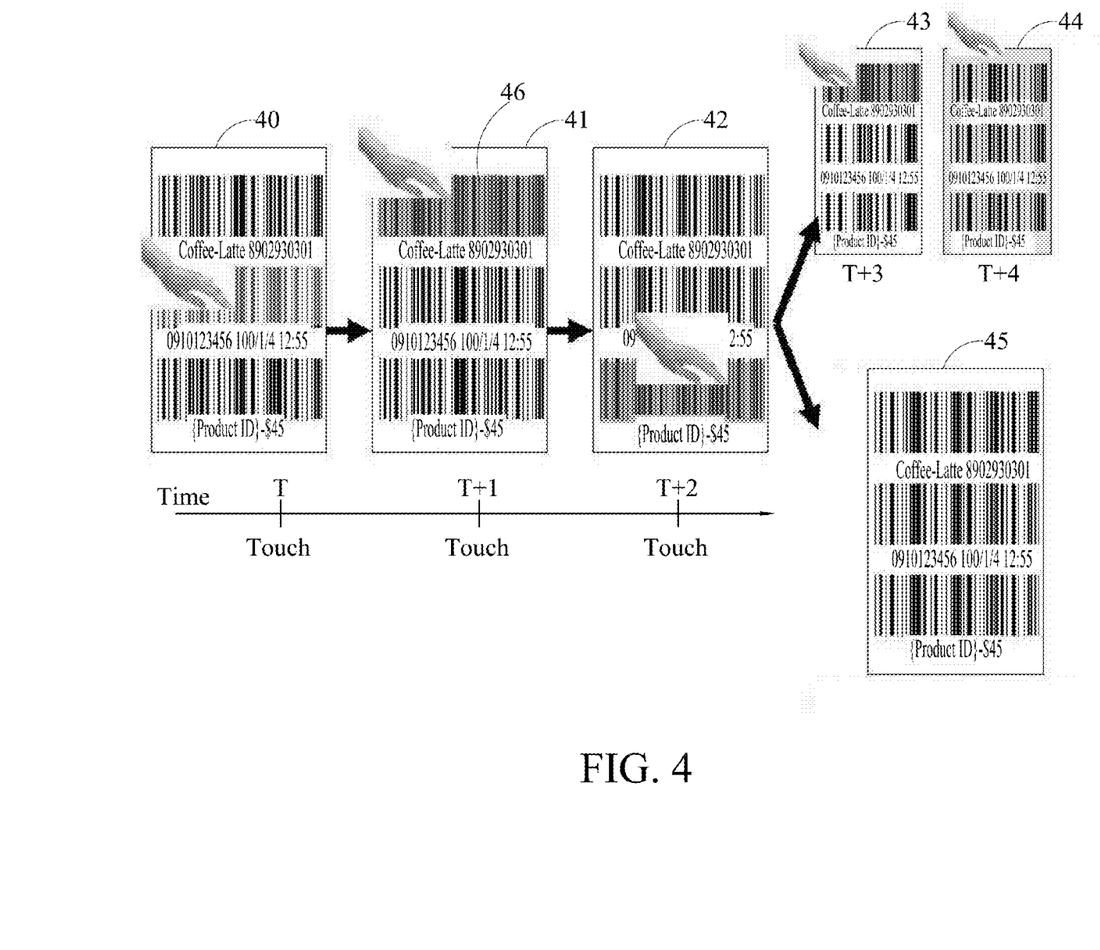
FIG. 4 is a schematic diagram illustrating the dynamic changes of the dynamic barcodes according to a third embodiment of the present disclosure.

FIG. 4 shows a schematic diagram of the dynamic changes of the dynamic barcodes according to a third embodiment of the present disclosure. In the third embodiment of the present disclosure, the anti-counterfeit generator module may dynamically change the dynamic anti-counterfeit label 46 (i.e., background color) of the electronic barcode while the electronic barcode displayed on the anti-counterfeit device is touched by a user. The dynamic anti-counterfeit label uses at least one color with a low light absorption rate that is selected randomly while the barcode reader is an infrared reader. Accordingly, in the third embodiment of the present disclosure, the dynamic anti-counterfeit label is not limited to one color and one size.

Specifically, the color of dynamic anti-counterfeit labels 40-44 may be changed directly while the electronic barcode is touched by a user. In one example of the present disclosure, while the middle section of the electronic barcode 40 is touched by a user, the background color of the middle section of the electronic barcode 40 may be changed. In another example of the present disclosure, while the top section of the electronic barcode 41 is touched by a user, the background color of the top section of the electronic barcode 41 may be changed. In an alternative example of the present disclosure, the background color of the bottom section of the electronic barcode 42 may be changed while the bottom section of the electronic barcode 42 is touched by a user. Accordingly, the dynamic anti-counterfeit label 46 may be a background color of the top section of the electronic barcode. In the case of the non-barcode area touched by a user, the background color of the electronic barcode 44 may be changed. In other words, the background color of the electronic barcode 44 may not be changed while the non-barcode area is touched by a user. Additionally, in the third embodiment of the present disclosure, the electronic barcode may be a two-dimensional barcode. The dynamic anti-counterfeit label and the anti-counterfeit method of the electronic barcode with random background colors are similar to these of the first embodiment of the present disclosure.

Therefore, these three embodiments of the present disclosure provide different anti-counterfeit mechanisms with the design of dynamic anti-counterfeit labels in order to determine whether an electronic barcode is remade, recorded or replicated. In addition, the dynamic anti-counterfeit labels may be random background colors or random background directions such that the electronic barcode with the dynamic anti-counterfeit labels may be read directly and correctly by a barcode reader. Accordingly, the problem of remaking, recording or replicating an electronic barcode can be solved by the present disclosure.

Additionally, the present disclosure also provides an anti-counterfeit system with dynamic barcodes. The anti-counterfeit system comprises an issuing server, a user anti-counterfeit device and an exchange server in order to enhance the anti-counterfeit capability of an electronic barcode.

The issuing server issues a value barcode. When the value barcode is issued, the issuing server will generate exchange information and a random number. The user anti-counterfeit device receives the exchange information and the random number generated by the issuing server, and then generates an electronic barcode with the exchange information and the random number based on the application software installed in the user anti-counterfeit device. A plurality of random numbers forms a random number sequence. The random number sequence may be a meaningful specific random number sequence or a meaningless random number sequence. Moreover, according to the present disclosure, the random number sequence generated may be meaningful or meaningless.

During the exchange process, the exchange server receives the exchange information and the random number generated by the issuing server, and compares the received exchange information and random number with the electronic barcode generated by the user anti-counterfeit device in order to ensure correctness of the exchange information when a user conducts a transaction, Preferably, the electronic barcode may be combined with the dynamic anti-counterfeit label. That is, the electronic barcode with the dynamic changes of the dynamic anti-counterfeit label is used to enhance anti-counterfeit capability of the electronic barcode.

The dynamic changes mean that the anti-counterfeit label may vary in time. The anti-counterfeit label may be changed by touching/rotating a user's anti-counterfeit device, or may be changed automatically. In other words, the dynamic anti-counterfeit label may be observed by a user if the anti-counterfeit label can be changed by touching/rotating a user's anti-counterfeit device, or may be changed automatically. Moreover, the issuing server generates a random number in each of the predetermined time in order to generate a random number sequence; that is, the random number sequence is generated due to the random numbers generated continuously and randomly. Therefore, the random numbers may vary in time.

Furthermore, there are two methods generating a random number sequence. The first method is to generate the random number sequence from the issuing server. Then the random number sequence is transmitted to the user anti-counterfeit device and the exchange server. The user anti-counterfeit device generates an electronic barcode corresponding to the random number sequence. When the exchange server receives the electronic barcode of the user anti-counterfeit device, the exchange server compares the random number sequence of the electronic barcode with the random number sequence transmitted by the issuing server. Additionally, another method for generating a random number sequence is to transmit a set of programming parameters to the user anti-counterfeit device and the exchange server. Subsequently, the user anti-counterfeit device and the exchange server are able to generate their random number sequences based on the set of programming parameters. Note that the random number sequences of the user anti-counterfeit device and the exchange server should be the same as the random number sequence of the issuing server. Accordingly, both the user anti-counterfeit device and the exchange server may compare their random number sequences.

Figure 5A:
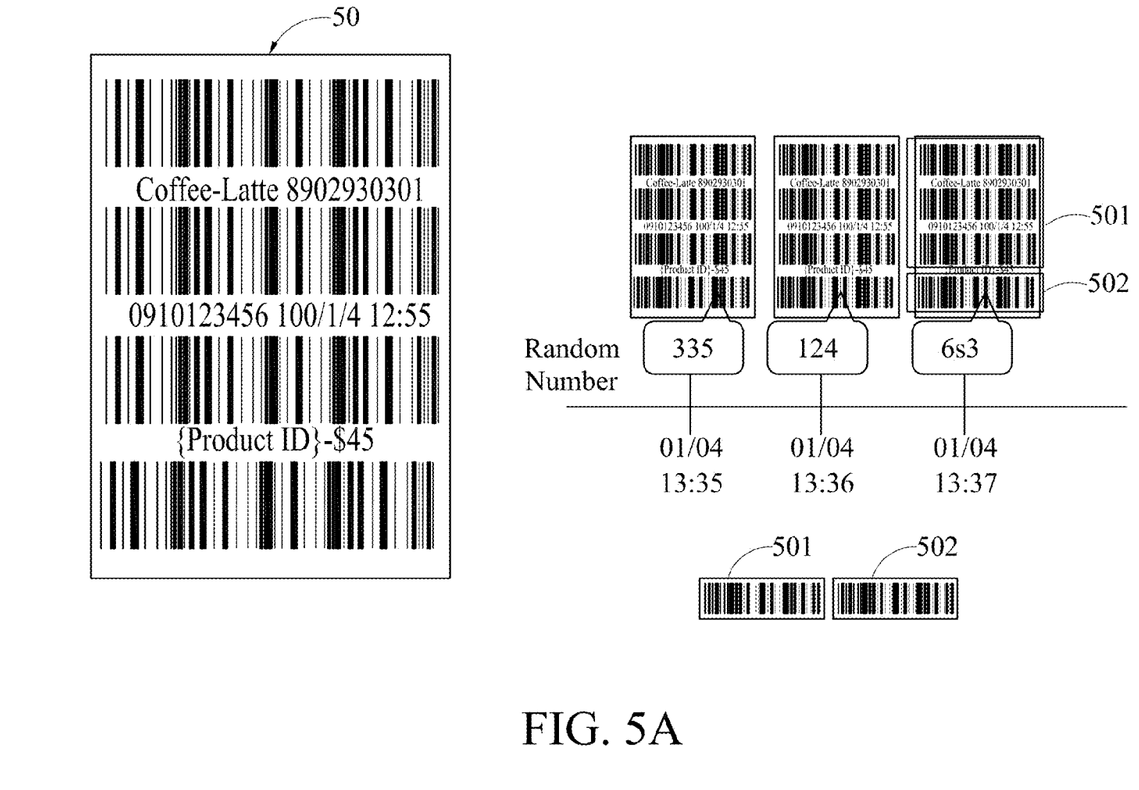
FIGS. 5A-5C are schematic diagrams illustrating an anti-counterfeit system with dynamic barcodes according to the present disclosure.
Figure 5B:
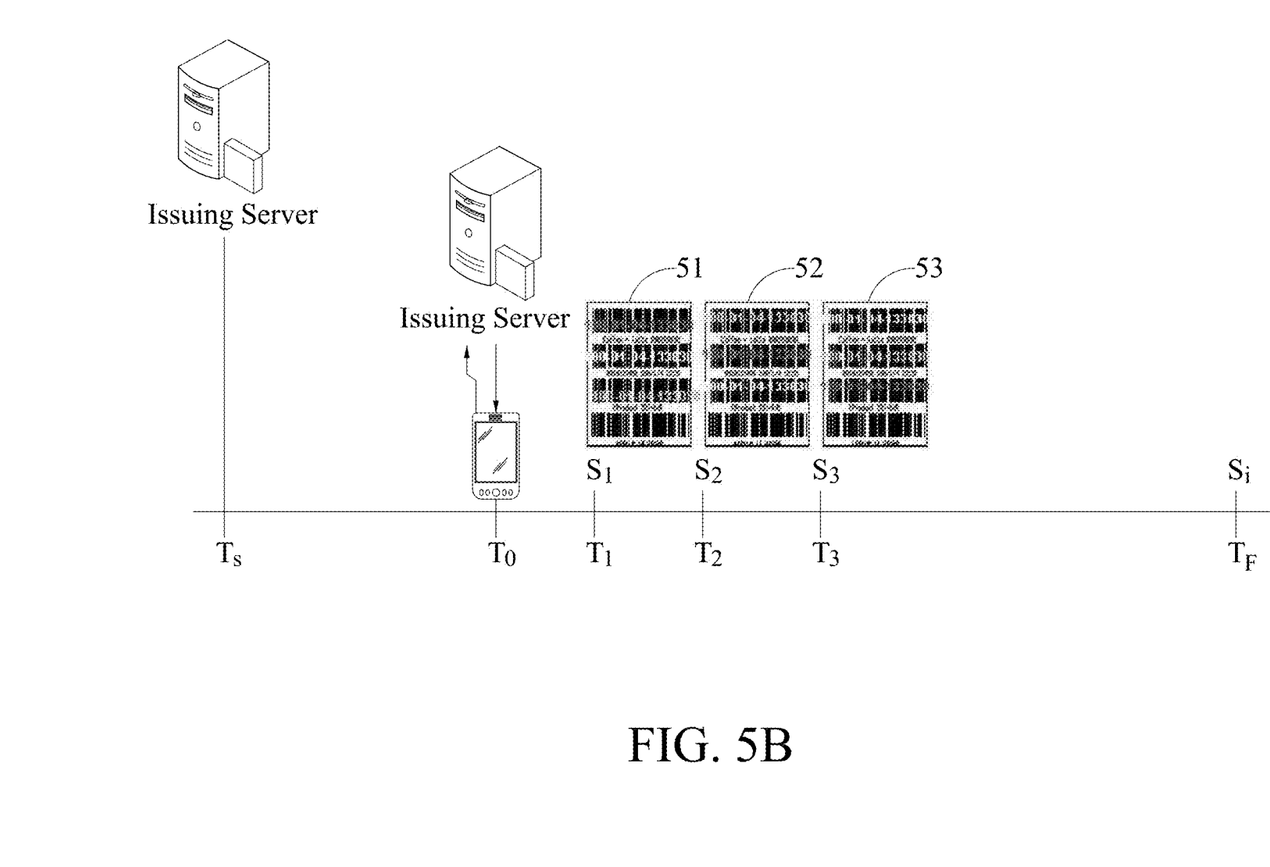

Referring to FIGS. 5A and 5B, the schematic diagrams of an anti-counterfeit system with dynamic barcodes are illustrated according to the present disclosure. As shown in FIG. 5A, the electronic barcode 50 comprises a foreground barcode and a background color. The foreground barcode may be read directly by a barcode reader, but the background color may not be read by the barcode reader. In other words, the foreground barcode with the background color may be read directly and correctly by the barcode reader. The electronic barcode 50 comprises exchange information 501 and a random number 502, as shown in FIG. 5A. In one example of the present disclosure, the random number 502 may be displayed below the exchange information 501. In another example of the present disclosure, the random number 502 may be displayed above the exchange information 501. In an alternative example of the present disclosure, the random number 502 and the exchange information 501 may be displayed in parallel. Moreover, referring to FIG. 5A, a single electronic barcode may comprise the exchange information 501 and the random number 502. The random number 502 may vary in time such that the essential anti-counterfeit mechanism is constituted. In addition to the design of the random number, various dynamic anti-counterfeit labels are also used as anti-counterfeit mechanisms in order to improve the anti-counterfeit capability of the electronic barcodes.

Referring to FIG. 5B, the issuing server, the user and the exchange server constitute an anti-counterfeit system with value barcodes. Suppose a value barcode is issued between $T_S$ and $T_F$. The issuing server may generate a random number for each t time unit (e.g., second or millisecond) in order to form a random number sequence $S^*$, wherein $S^*=\{s_i | 1 \leq j \leq (T_F - T_S)/t\}$. When a user submits an exchange request to the issuing server at $T_0$, the issuing server may transmit exchange information and a random number sequence S corresponding to the exchange request to a user anti-counterfeit device (such as a smartphone). The user anti-counterfeit device may generate an electronic barcode based on the exchange information and the random number sequence S. The electronic barcodes with the exchange information $s_j$ are generated in each t second, wherein $S^*=\{s_j | 1 \leq j \leq (T_F - T_0)/t\}$, $T_S \leq T_0$, $S \in S^*$. The dynamic barcodes 51-53 are shown in FIG. 5B and the random numbers vary in time. Additionally, the exchange information and the random number sequence $S^*$ are transmitted to the exchange server before the issuing server issues the value barcode. Consequently, the exchange server has sufficient information to determine whether the exchange information is valid. A real-time network between the issuing server and the exchange server is not necessary and thereby the transaction cost may be reduced.

Figure 5C:
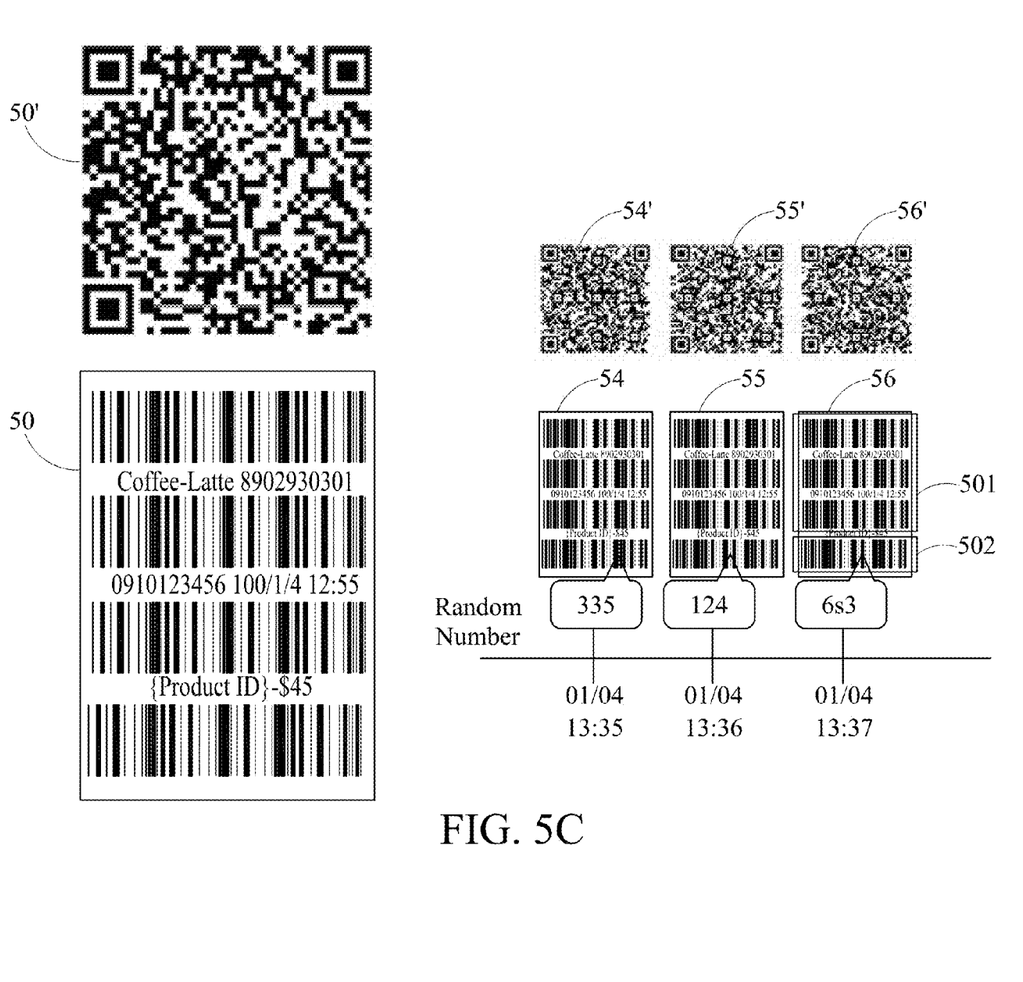

Besides, according to the present disclosure, the electronic barcode of the present disclosure may be a one-dimensional barcode, a two-dimensional barcode or a multi-dimensional barcode. In one embodiment of the present disclosure, a two-dimensional electronic barcode is used. As shown in FIG. 5C, the electronic barcode is a one-dimensional barcode 50. In addition, the electronic barcode may also be a two-dimensional barcode 50'. Referring to FIG. 5A, the dynamic barcodes 54-56 illustrated may vary in time, and each of the dynamic barcode 54-56 comprises the exchange information 501 and the random number 502. If the electronic barcode is a two-dimensional barcode, two-dimensional dynamic barcodes 54'-56' may also comprise the exchange information 501 and the random number 502. Accordingly, the electronic barcodes of the present disclosure are not limited to the electronic barcodes, as shown in FIG. 5C. Only a variety of dynamic anti-counterfeit labels may be combined with the electronic barcodes, and may enhance the anti-counterfeit capability of the electronic barcodes.

Figure 6:
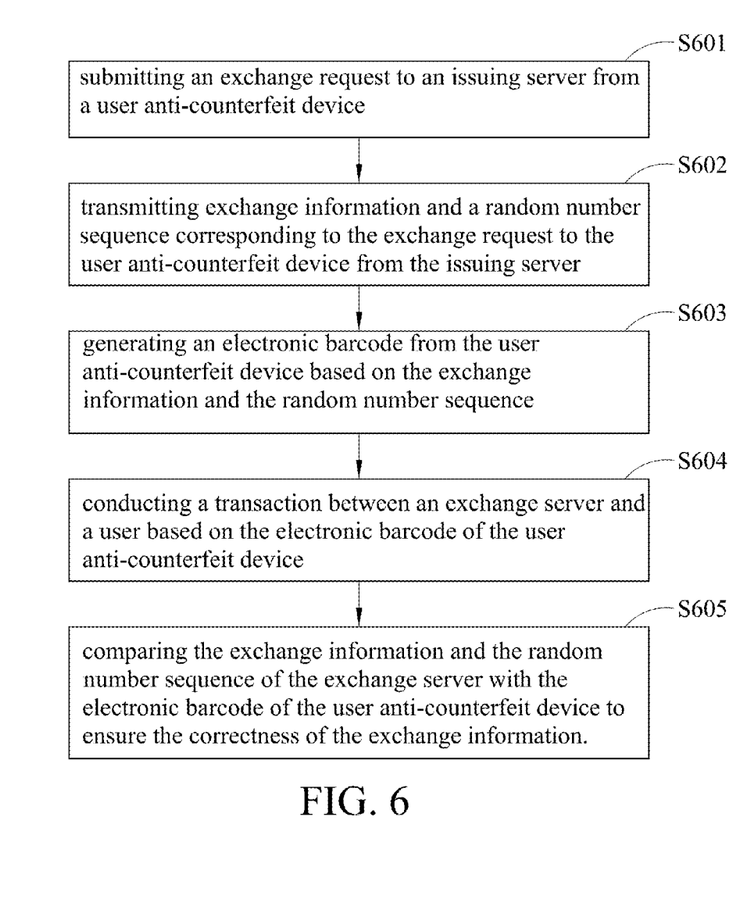
FIG. 6 is a flowchart illustrating an anti-counterfeit method with dynamic barcodes according to the present disclosure.

Referring to FIG. 6, a flowchart of the anti-counterfeit method with dynamic barcodes is illustrated according to the present disclosure. The anti-counterfeit method begins with step S601 of submitting an exchange request to an issuing server from a user anti-counterfeit device. That is to say, when a user would like to use a value barcode, the user anti-counterfeit device, such as a mobile phone, may submit an exchange request to an issuing server.

In step S602, the issuing server transmits exchange information and a random number sequence corresponding to the exchange request to the user anti-counterfeit device. Specifically, the issuing server will transmit the exchange information and the random number sequence in connection with the exchange request to the user anti-counterfeit device. The exchange information may be a product number, a price or an exchange deadline. The random number is used for determining whether an electronic barcode is generated correctly. According to the present disclosure, the random number may vary in time.

Subsequently, in step S603, an electronic barcode is generated by the user anti-counterfeit device based on the exchange information and the random number sequence. In one example of the present disclosure, the user anti-counterfeit device receives the exchange information and the random number sequence from the issuing server in order to generate an electronic barcode through the internal application software.

In step S604, a transaction between an exchange server and a user is conducted based on the electronic barcode of the user anti-counterfeit device. In other words, a user may use the electronic barcode to conduct the transaction between an exchange server and the user anti-counterfeit device. According to the present disclosure, the exchange server will determine whether the electronic barcode is valid.

Afterwards, in step S605, the exchange information and the random number sequence are compared with the electronic barcode of the user anti-counterfeit device to ensure correctness of the exchange information. That is to say, the exchange server may compare the electronic barcode with the exchange information and the random number sequence predefined by the exchange server in order to ensure correctness of the exchange information.

In one embodiment of the present disclosure, the user anti-counterfeit device may install the application software, which is able to generate dynamic anti-counterfeit labels. The dynamic anti-counterfeit labels may be combined with the electronic barcode. The electronic barcode with a random number may determine whether the exchange information is valid or not. With the use of the dynamic anti-counterfeit labels, it may be initially determined whether the electronic barcode is valid. Consequently, only based on the random number, it may not be determined correctly whether the electronic barcode is valid or not. As a result, the electronic barcode combined with the dynamic anti-counterfeit labels is able to enhance the anti-counterfeit capability of the electronic barcode.

In one embodiment of the present disclosure, before the user anti-counterfeit device submits the exchange request, the issuing server transmits the exchange information and the random number sequence to the user anti-counterfeit device, and the exchange information and the random number sequence are transmitted to the exchange server. In other words, while the issuing server transmits the exchange information and the random number sequence to the user anti-counterfeit device, the exchange information and the random number sequence are also transmitted to the exchange server. According to the present disclosure, in step 605, the exchange server includes the exchange information and the random number sequence.

In another embodiment of the present disclosure, before the user anti-counterfeit device submits the exchange request, the issuing server transmits the exchange information and the random number sequence to the exchange server. While the user anti-counterfeit device submits the exchange request, the exchange information and the random number sequence are transmitted to the user anti-counterfeit device. That is to say, the exchange server may receive the exchange information and the random number sequence in advance. Generally speaking, the issuing server may determine a time to send the exchange information and the random number sequence to the exchange server and the user anti-counterfeit device based on different circumstances.

In summary, the present disclosure provides an anti-counterfeit device with dynamic barcodes. The dynamic barcodes comprise electronic barcodes and dynamic anti-counterfeit labels. The dynamic anti-counterfeit labels may be a dynamic time label, a direction label and a touch-based label. Accordingly, the problem of remaking, recording or replicating electronic barcodes can be resolved based on the design of the dynamic barcodes. In addition, the present disclosure further provides an anti-counterfeit device with the dynamic barcodes and the method thereof. Random numbers may vary in time, and may be used to determine whether value barcodes with exchange information among an issuing server, a user anti-counterfeit device and an exchange server are valid. Moreover, a real-time network among these three devices is not necessary. According to the present disclosure, the anti-counterfeit device with the dynamic anti-counterfeit labels and the random the numbers is able to enhance the anti-counterfeit capability of electronic barcodes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An anti-counterfeit device with dynamic barcodes, comprising:
   a barcode generator module for generating an electronic barcode for a barcode reader to read;
   an anti-counterfeit generator module for generating a dynamic anti-counterfeit label in each of a predetermined time; and
   a combination module for generating an anti-counterfeit barcode by combining the electronic barcode and the dynamic anti-counterfeit label, the dynamic anti-counterfeit label is overlapped above or below the electronic barcode, and wherein the electronic barcode with the dynamic anti-counterfeit label is read by the barcode reader.

2. The anti-counterfeit device of claim 1, wherein the electronic barcode is a one-dimensional barcode, a two-dimensional barcode or a multi-dimensional barcode.

3. The anti-counterfeit device of claim 1, wherein the anti-counterfeit generator module dynamically adjusts the dynamic anti-counterfeit label in each of the predetermined time.

4. The anti-counterfeit device of claim 1, wherein the anti-counterfeit generator module generates a direction corresponding to the dynamic anti-counterfeit label based on movement or rotation of the anti-counterfeit device.

5. The anti-counterfeit device of claim 1, wherein the anti-counterfeit generator module dynamically adjusts a color of the dynamic anti-counterfeit label while the electronic barcode displayed on the anti-counterfeit device is touched by a user.

6. The anti-counterfeit device of claim 1, wherein the electronic barcode with the dynamic anti-counterfeit label having at least one color with a low light absorption rate is read by the barcode reader and the dynamic anti-counterfeit label does not affect reading of the electronic barcode, wherein the color and size of the dynamic anti-counterfeit label are selected randomly or predefined by an issuing server.

7. The anti-counterfeit device of claim 1, wherein the barcode reader is an infrared reader or an ultraviolet reader.

8. An anti-counterfeit system with dynamic barcodes, comprising:

an issuing server for generating exchange information and a random number sequence;

a user anti-counterfeit device for receiving the exchange information and the random number sequence generated by the issuing server, and generating an electronic barcode with the exchange information and the random number sequence, wherein the random number sequence is overlapped above or below the exchange information; and an exchange server for receiving the exchange information and the random number sequence generated by the issuing server, and comparing the received exchange information and random number sequence with the electronic barcode generated by the user anti-counterfeit device in order to ensure correctness of the exchange information when a user conducts a transaction.

9. The anti-counterfeit system of claim 8, wherein the electronic barcode is a one-dimensional barcode, a two-dimensional barcode or a multi-dimensional barcode.

10. The anti-counterfeit system of claim 8, wherein the electronic barcode of the user anti-counterfeit device associated with a dynamic anti-counterfeit label is used to enhance the anti-counterfeit capability of the electronic barcode.

11. The anti-counterfeit system of claim 8, wherein the issuing server generates a random number in each of a predetermined time in order to generate the random number sequence.

12. The anti-counterfeit system of claim 11, wherein the electronic barcode comprises the exchange information and the random number, or comprises the exchange information and the random numbers with different locations represented as more than one electronic barcode.

13. The anti-counterfeit system of claim 8, wherein the random number sequence of the issuing server, the user anti-counterfeit device and the exchange server vary in time.

14. The anti-counterfeit system of claim 8, wherein the issuing server transmits a set of parameters to the user anti-counterfeit device and the exchange server, and the user anti-counterfeit device and the exchange server generate the same random number sequence respectively.

15. An anti-counterfeit method with dynamic barcodes, comprising the steps of:

submitting an exchange request to an issuing server from a user anti-counterfeit device;

transmitting exchange information and a random number sequence corresponding to the exchange request to the user anti-counterfeit device from the issuing server;

generating an electronic barcode from the user anti-counterfeit device based on the exchange information and the random number sequence, wherein the random number sequence is overlapped above or below the exchange information;

conducting a transaction between an exchange server and a user based on the electronic barcode shown on the user anti-counterfeit device; and comparing the exchange information and the random number sequence of the exchange server with the electronic barcode of the user anti-counterfeit device to ensure correctness of all the exchange information including the random number.

16. The anti-counterfeit method of claim 15, wherein the electronic barcode with a dynamic anti-counterfeit label having dynamic changes is used to enhance the anti-counterfeit capability of the electronic barcode, wherein the dynamic changes comprise changes by touching/rotating a user anti-counterfeit device, or automatically changes with time.

17. The anti-counterfeit method of claim 15, further comprising the step of transmitting the exchange information and the random number sequence to the user anti-counterfeit device and the exchange server, respectively from the issuing server before the user anti-counterfeit device submits the exchange request.

18. The anti-counterfeit method of claim 15, further comprising the steps of transmitting the exchange information and the random number sequence to the exchange server from the issuing server before the user anti-counterfeit device submits the exchange request, and transmitting the exchange information and the random number sequence to the user anti-counterfeit device when the user anti-counterfeit device submits the exchange request.

* * * * *